(12) United States Patent
Gribetz et al.

(10) Patent No.: US 9,990,872 B1
(45) Date of Patent: *Jun. 5, 2018

(54) SYSTEM AND METHOD FOR PROVIDING VIEWS OF VIRTUAL CONTENT IN AN AUGMENTED REALITY ENVIRONMENT

(71) Applicant: META COMPANY, San Mateo, CA (US)

(72) Inventors: Meron Gribetz, Belmont, CA (US); Raymond Chun Hing Lo, Ontario (CA); Ashish Ahuja, Mountain View, CA (US); Zhangyi Zhong, San Francisco, CA (US); Steven Merlin Worden, Fremont, CA (US)

(73) Assignee: Meta Company, San Mateo, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/711,724

(22) Filed: Sep. 21, 2017

Related U.S. Application Data (63) Continuation of application No. 15/197,721, filed on Jun. 29, 2016, now Pat. No. 9,773,438.

(51) Int. Cl.
| | |
|---|---|
| G09G 3/00 | (2006.01) |
| G06T 15/20 | (2011.01) |
| G09G 3/3208 | (2016.01) |
| G09G 5/391 | (2006.01) |
| G09G 5/10 | (2006.01) |
| G06T 19/00 | (2011.01) |

(Continued)

(52) U.S. Cl.
CPC ......... *G09G 3/003* (2013.01); *G02B 27/0172* (2013.01); *G06T 15/20* (2013.01); *G06T 19/006* (2013.01); *G09G 3/3208* (2013.01); *G09G 3/36* (2013.01); *G09G 5/10* (2013.01); *G09G 5/391* (2013.01); *G02B 2027/0118* (2013.01); *G02B 2027/0127* (2013.01)

(58) Field of Classification Search
CPC ........ G09G 3/003; G09G 3/36; G09G 3/3208; G09G 5/10; G09G 5/391; G06T 15/20; G06T 19/006
USPC ....................................................... 345/694
See application file for complete search history.

(56) References Cited

U.S. PATENT DOCUMENTS

| | | |
|---|---|---|
| 9,345,967 B2 | 5/2016 | Zhang |
| 9,576,399 B2 | 2/2017 | Lo |

(Continued)

*Primary Examiner* — Fred Tzeng
(74) *Attorney, Agent, or Firm* — Sheppard Mullin Richter & Hampton LLP (57) ABSTRACT

A system configured for providing views of virtual content in an augmented reality environment may comprise one or more of a first display, a second display, an optical element, one or more processors, and/or other components. The first display and second display may be separated by a separation distance. The first display and second display may be arranged such that rays of light emitted from pixels of the first display may travel through the second display, then reflect off the optical element and into a user's eyes. A three-dimensional light field perceived with a user's field-of-view may be generated. Distances of the first display and/or second display to the optical element may impact a perceived range of the three-dimensional light field. The separation distance may impact a perceived depth of the three-dimensional light field and/or a resolution of virtual content perceived with the three-dimensional light field.

20 Claims, 5 Drawing Sheets

(51) Int. Cl.
G09G 3/36 (2006.01)
G02B 27/01 (2006.01)

(56) References Cited

U.S. PATENT DOCUMENTS

| | | |
|---|---|---|
| 9,773,438 B1 * | 9/2017 | Gribetz ................. G09G 3/003 |
| 2003/0034974 A1 | 2/2003 | Welch |
| 2003/0034976 A1 | 2/2003 | Raskar |
| 2003/0038822 A1 | 2/2003 | Raskar |
| 2003/0043152 A1 | 3/2003 | Raskar |
| 2003/0052890 A1 | 3/2003 | Raskar |
| 2009/0189974 A1 | 7/2009 | Deering |
| 2012/0069413 A1 | 3/2012 | Schultz |
| 2012/0218188 A1 | 8/2012 | Kashitani |
| 2015/0049004 A1 | 2/2015 | Deering |
| 2015/0288944 A1 | 10/2015 | Nistico |
| 2015/0331576 A1 | 11/2015 | Piya |
| 2016/0086423 A1 | 3/2016 | Keilwert |
| 2016/0171814 A1 | 6/2016 | Froy |
| 2017/0235143 A1 | 8/2017 | Chi |

* cited by examiner

SYSTEM AND METHOD FOR PROVIDING VIEWS OF VIRTUAL CONTENT IN AN AUGMENTED REALITY ENVIRONMENT

FIELD OF THE INVENTION

The system and methods described herein relate to providing views of virtual content in an augmented reality (AR) environment.

BACKGROUND OF THE INVENTION

There are many types of vision systems that provide virtual or augmented reality displays. In particular, wearable technology such as head mounted displays (HMD) are becoming more popular.

SUMMARY

The systems and methods described herein facilitate providing views of virtual content (e.g., virtual objects in the form of three dimensional digital imagery) in a virtual environment, such as an augmented reality environment. One or more displays may project images of virtual content onto an optical element. The optical element may comprise, for example, a visor of an HMD, and/or other optical elements. Virtual content may be perceived within a three dimensional light field within a viewing users field-of-view to create an augmented reality experience. Virtual content may be perceived at individual focal planes within the three-dimensional light field. Individual focal planes may have individual depths-of-field within the field-of-view of the user.

A system configured for providing views of virtual content in a virtual environment, such as an augmented reality environment, may comprise one or more of a first display coupled to a first carrier, a second display coupled to a second carrier, an optical element, one or more physical processors, and/or other components. The second display may be arranged a first separation distance from the first display. The optical element may be arranged a first distance from the first display and a second distance from the second display. The optical element may be configured to reflect light emitted from the first display in a first focal plane and/or other focal planes of a perceived three-dimensional light field. The optical element may be configured to reflect light emitted from the second display in a second focal plane and/or other focal planes of the perceived three-dimensional light field. Distances of the first display and/or second display to the optical element may impact a perceived range of the three-dimensional light field. The first separation distance may impact a perceived depth of the three-dimensional light field and/or a resolution of virtual content perceived with the three-dimensional light field.

The one or more physical processor may be configured by machine-readable instructions. Executing the machine-readable instructions may cause the one or more physical processors to facilitate providing views of virtual content in an augmented reality environment. The machine-readable instructions may comprise one or more computer program components. The one or more computer program components may comprise one or more of a content component, a display control component, and/or other components.

The content component may be configured to determine virtual content to present to a user. Virtual content may include one or more virtual objects and/or other virtual content.

The display control component may be configured to control individual displays. Control may comprise controlling one or more pixels of one or more displays, controlling positions of individual display via individual carriers of the individual displays, and/or other types of control. In some implementations, a relative intensity of one or more pixels of the first display and/or the second display may be controlled to generate virtual content in a perceived three-dimensional light field. The control of the relative intensity of the one or more pixels of the first display and the second display may determine perceived ranges to the virtual content within the three-dimensional light field.

In some implementations, the display control component may be configured to control positions of the first carrier and second carrier to adjust the first distance and the second distance. The first distance and/or the second distance may impact a perceived range of the three-dimensional light field.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
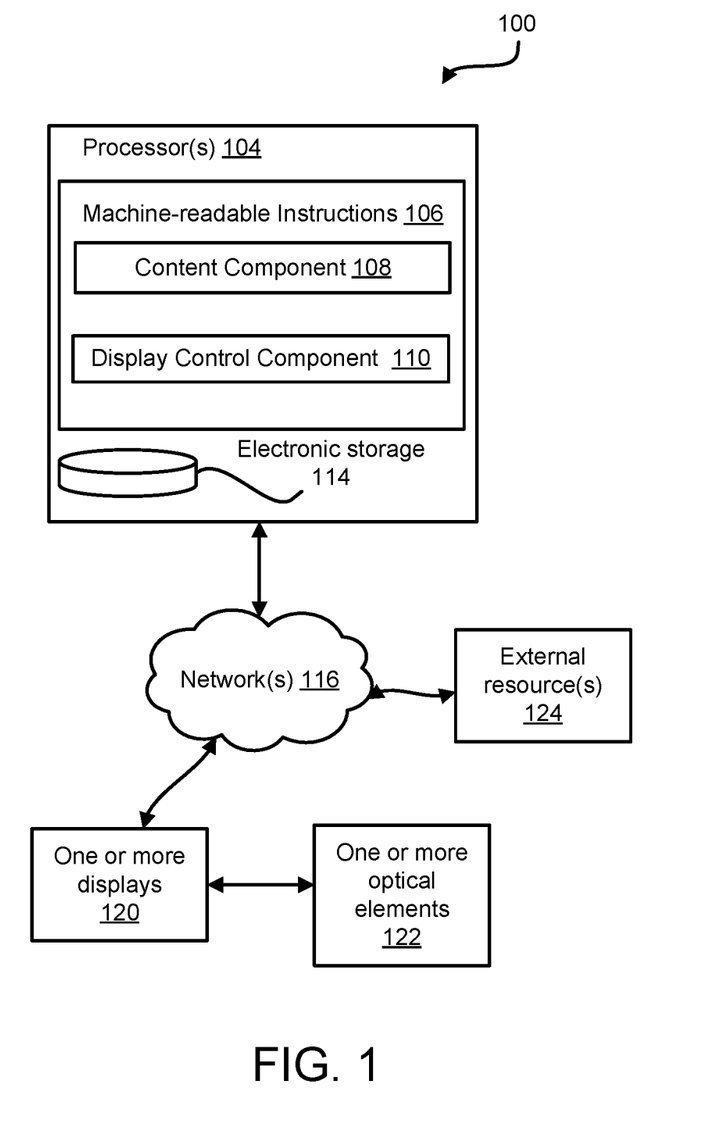
FIG. 1 illustrates a system configured for providing views of virtual content in an augmented reality environment, in accordance with one or more implementations.

FIG. 1 shows a system 100 configured for providing views of virtual content in an augmented reality environment. The human perceptual system has the ability to combine various sensory cues in an efficient manner in order to perceive 'physically plausible' virtual content in real-world space. For example, the human perceptual system has the ability to integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in real-world space by virtue of the principles of the depth sensitive modules of the human brain.

The system 100 may include one or more of one or more physical processors 104, one or more displays 120, one or more optical elements 122, and/or other components. In some implementations, one or more components of system 100 may be incorporated in a head-mounted display (HMD), and/or other devices. By way of non-limiting illustration, one or more optical elements 122 may comprise at least part of a visor of an HMD, and/or other components. An optical element may comprise one or more reflective, or partially reflective surfaces. An optical element may be formed from a reflective and/or partially reflective material. A reflective and/or partially reflective material may comprise one or more of ZEONEX, polycarbonate, PMMA, and/or other materials.

In some implementations, individual displays of the one or more displays 120 may comprise one or more of a liquid crystal display (LCD), a light emitting diode (LED) display, surface-conduction electron-emitter display (SED), a plasma display, a transparent organic light emitting diode (OLED) display, a MEMS mirror based display, liquid crystal on silicon (LCoS) display, digital light projector (DLP), and/or other displays. An individual display may comprise an array of addressable optical components. Individual optical components may be individually controllable to impact one or more aspects of light to create digital images. By way of non-limiting illustration, individual optical components of a display may be individually controllable to impact one or more of transmissivity, brightness, generation, reflection, refraction, and/or other aspects of light to create images.

In some implementations, one or more displays 120 may be positioned relative to one or more optical elements 122 and a user, such that light emitted from one or more display 120 may be reflected by one or more optical elements 122 to the eyes of the user. The user may perceive the reflected light as virtual content within their field-of-view. In some implementations, the farther one or more displays 120 may be positioned from one or more optical elements 122, the more distant projected virtual content may appear to the viewer.

In some implementations, individual ones of one or more displays 120 may be coupled to individual carriers of the individual displays. Individual carriers may be independently positionable relative other carriers (via, for example, display control component 110). In some implementations, individual carriers may comprise one or more of a track, a mount, a hinge, a linkage, a spring, and/or other components. In some implementations, individual carriers may comprise individual drive components configured to facilitate movement of the individual carriers. Individual drive components may comprise one or more of a motor, an actuator, one or more magnets, one or more piezoelectric motors, and/or other drive components. Movement may be one or both of translational and/or rotational. In some implementations, movement may be restricted along a predetermined path. In some implementations, the path may be an arched or parabolic path. In some implementations, individual carriers may be configured to move along individual paths. In some implementations, a set of two or more carriers may be configured to move along a shared path.

In some implementations, one or more optical elements 122 may be positioned relative to one or more displays 120 to reflect light to the eyes of a user. The reflected light may generate a perceived gradient three-dimensional light field within the field-of-view of the user. The three-dimensional light field may comprise one or more virtual focal planes corresponding to individual ones of one or more displays 120. Individual perceived ranges of individual ones of the focal planes may be determined based on individual distances of individual one of the one or more displays 120 from one or more optical elements 122. In a system comprising a set of two or more displays, a separation distance between two displays may impact one or more of a perceived depth of a three-dimensional light field and/or resolution of virtual content perceived within the light field.

In some implementations, individual ones of one or more optical elements 122 may be curved at one or more regions to reflect light from one or more displays 120 to a corresponding eye of a user to create a perceived three-dimensional light field. The three-dimensional light field may include one or more focal planes corresponding to individual ones of one or more displays 120. In some implementations, the curvature of an optical element may cause a focal plane to be a curved plane in space. In some implementations, virtual content appearing at a top part of a focal plane may be perceived to be closer to a user than virtual content appearing at a bottom part of a focal plane.

In some implementations, one or more physical processors 104 may be configured by machine-readable instructions 106. Executing machine-readable instructions 106 may cause one or more physical processors 104 to facilitate providing views of virtual content in an augmented reality environment. The machine-readable instructions 106 may include one or more of a content component 108, a display control component 110, and/or other components.

In some implementations, content component 108 may be configured to determine virtual content to present to a user. Virtual content may include one or more virtual objects and/or other virtual content.

In some implementations, display control component 110 may be configured to control one or more displays 120. In some implementations, control of one or more displays 120 by display control component 110 may comprise one or more of control of one or more pixels of individual ones of one or more displays 120, control of individual positions of individual displays via individual carriers of the individual displays, and/or other types of control.

In some implementations, controlling an individual pixel of an individual display may cause a light ray to travel from the individual pixel of the individual display and reflect off an optical element into a user's eye(s), wherein the user may perceive virtual content in three-dimensional space within their field-of-view of the real-world. Control of pixels of an individual display to generate virtual content may cause the virtual content to be perceived by the viewing user to lie within three-dimensional real space at a range that may be equal to a range of a focal plane within the viewing user's field-of-view, and/or other ranges. In some implementations, control of one or more pixels of one or more displays 120 may be based on virtual content determined to be presented to a user (e.g., via content component 108), and/or other information.

In some implementations, control of one or more pixels of displays in a set of two or more displays may impact a range of virtual content perceived within a three-dimensional light field. In particular, controlling a relative intensity of one or more pixels of individual displays in a set of two or more displays may impact a focal range at which virtual content may be perceived (see, e.g., FIG. 3). For example, in some implementations, display control component 110 may turn off a pixel in a second display that corresponds to a pixel in a first display in order to present virtual content to the user within a pre-defined focal plane.

In some implementations, control by display control component 110 may comprise control of individual positions of individual displays via individual carriers of the individual displays. Control of positions of individual displays may adjust individual distances of individual displays to individual optical elements. Individual distances of individual displays to individual optical elements may impact a range of virtual content perceived within a three-dimensional light field. In some implementations, in a system comprising a set of two or more displays, a separation distance between two displays may impact one or more of a depth of a three-dimensional light field, a resolution of virtual content presented within the three-dimensional light field, and/or other attributes of an augmented reality experience. In some implementations, in a system comprising a set of two or more displays, adjusting positions of two displays without adjusting a separation distance between the two displays may impact a perceived range of a three-dimensional light field but may not impact a depth of the three-dimensional light field. By way of non-limiting illustration, positions of the two or more displays may be adjusted synchronously in a fixed display stack without changing a separation distance.

Figure 2:
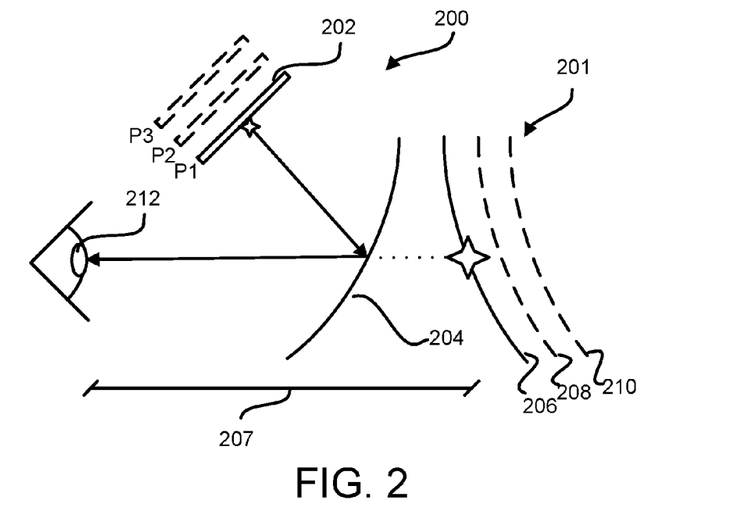
FIG. 2 illustrates an exemplary configuration of a system configured for providing views of virtual content in an augmented reality environment, in accordance with one or more implementations.

FIG. 2 shows an exemplary system 200 configured for providing views of virtual content in an augmented reality environment. The system 200 may comprise one or more of a first display 202, an optical element 204, one or more physical processors (not shown), and/or other components. In some implementations, one or more of first display 202, optical element 204, and/or other components may be incorporated into a head-mounted display, and/or other devices. In system 200, one or more pixels of first display 202 may be controlled (e.g., via a display control component such as display control component 110 in FIG. 1) to generate light rays that may reflect off of optical element 204 and into eyes 212 of a user.

In FIG. 2, position of first display 202 via a first carrier (not shown in FIG. 2) may be controlled (e.g., via a display control component such as display control component 110 in FIG. 1). By way of non-limiting illustration, potential positions P1, P2, and P3 of first display 202 are shown. In some implementations, due to a curvature of optical element 204, corresponding potential virtual focal planes 206, 208, and 210 may also exhibit a curvature in space. Position P1 may position first display 202 at a distance from optical element 204 that may be less than distances of positions P2 and P3 from optical element 204. Position P2 may position first display 202 at a distance from optical element 204 that may be closer than P3 and farther than P1 from optical element 204. The distance of first display 202 from optical element 204 may impact a perceived range 207 of a focal plane within three-dimensional light field 201. By way of non-limiting illustration, focal plane 206 may correspond to position P1; focal plane 208 may correspond to position P2; and focal plane 210 may correspond to position P3. By way of non-limiting illustration, focal plane 206 may be perceived as closer to the viewing user than focal plane 208 and focal plane 210; focal plane 208 may be perceived as closer to the viewing user than focal plane 210 and farther from the viewing user than focal plane 206; and focal plane 210 may be perceived farther from the viewing user than focal plane 206 and focal plane 208. It is noted that although only three discrete positions and three discrete focal planes are shown, this is for illustrative purposes only. It is to be understood that a position of first display 202 may be incrementally adjusted between positions P1, P2, P3 and/or other positions to obtain incremental adjustments to the perceived range of a focal plane within three-dimensional light field 201.

Figure 3:
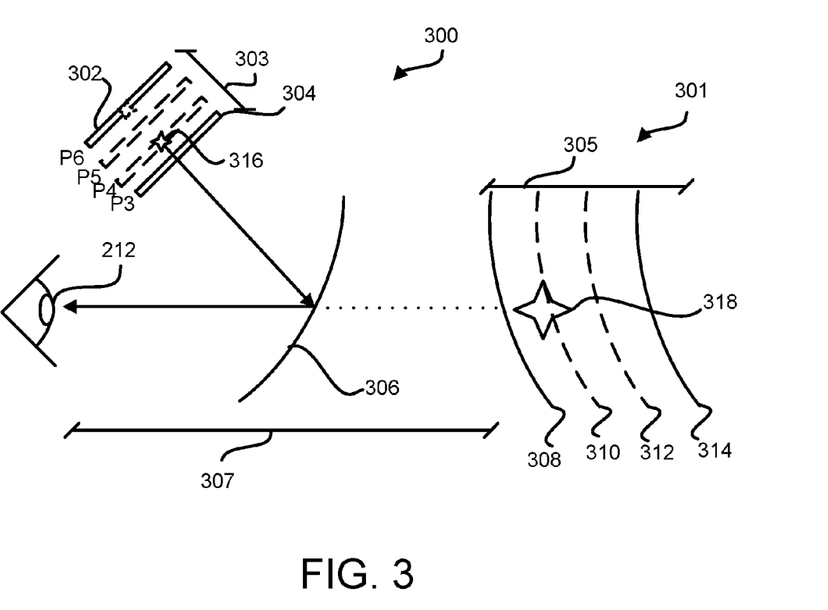
FIG. 3 illustrates another exemplary configuration of a system configured for providing views of virtual content in an augmented reality environment, in accordance with one or more implementations.

FIG. 3 illustrate an exemplary system 300 configured for providing views of virtual content in an augmented reality environment. The system 300 may comprise one or more of a first display 302 coupled to a first carrier (not shown), a second display 304 coupled to a second carrier (not shown), an optical element 306, and/or other components. In some implementations, one or more components of system 300 may be incorporated into a head-mounted display, and/or other devices. The second display 304 may comprise an at least partially transparent display (e.g., one or more of a transparent OLED, and LC display with no backlight, and/or other display). The first display 302 and second display 304 may be arranged such that rays of light emitted from one or more pixels of first display 302 may travel through second display 304, then reflect off optical element 306 and into a user's eyes 212. A perceived three-dimensional light field 301 may be generated. In some implementations, one or more pixels of first display 302 may be aligned with one or more pixels of second display 304. In some implementations, pixel alignment may refer to the relative location of the pixels on first display 302 and pixels on second display 304 based on the path of a light ray through a pixel of first display 302 being aligned with a light ray through another pixel of second display 304.

In FIG. 3, first display 302 may be positioned at position P6. The second display 304 may be positioned at position P3. Position P6 may be farther from optical element 306 than position P3. The first display 302 may be positioned with respect to second display 304 by a separation distance 303. The first display 302 may be arranged at a distance farthest from optical element 306 to generate virtual content perceived at a range corresponding to a focal plane 314. The second display 304 may be arranged a distance between first display 302 and optical element 306 to generate virtual content perceived at a range corresponding to a focal plane 308.

In some implementations, control of one or more pixels of first display 302 and/or second display 304 may impact a range of virtual content perceived within three-dimensional light field 301 with depth 305. If the same or similar virtual content (e.g., digital images) is generated and aligned on both first display 302 and second display 304, the human visual system may integrate the digital images, whose perceived depth may depend on a relative intensity of the pixels forming the virtual content in each of the first display 302 and second display 304. When projected virtual content is only generated by first display 302, and second display 304 is completely and/or partially dim but still transparent (e.g., emitting little or no light rays), the virtual content may be perceived at a depth of focal plane 314. When projected virtual content is only generated by second display 304, and first display 302 is completely and/or partially dim (e.g., with a backlight emitting some or no light rays), the virtual content may be perceived at a depth of focal plane 308. However, when an illumination of the virtual content is distributed across first display 302 and second display 304, the virtual content may be perceived a depth between focal plane 308 and focal plane 314. By way of non-limiting illustration, by controlling a relative intensity of aligned pixels of first display 302 and second display 304 to generate an image 316 of virtual content (e.g., via a display control component such that display control component 110 in FIG. 1), projected virtual content 318 may be perceived at focal plane 310 that may lie between focal plane 308 and focal plane 314. This may be equivalent to providing a single display at position P4. By way of non-limiting illustration, focal plane 310 may be positioned at a range that may be closer to focal plane 308 than focal plane 314 by controlling pixels on second display 304 to be relatively brighter than aligned pixels on first display 302. Similarly, by controlling pixels on first display 302 to be relatively brighter than aligned pixels on second display 304, projected virtual content 318 may be perceived at focal plane 312 that may lie between focal plane 308 and focal plane 314, and closer to focal plane 314 than focal plane 308. This may be equivalent to providing a single display at position P5. Thus, by modulating intensity of the light rays emitted by aligned pixels corresponding to the same image 316 of virtual content presented by the different displays 302, 304, projected virtual content 318 may be perceived by a viewer to appear at various ranges within perceived depth 305 of three-dimensional light field 301.

In some implementations, separation distance 303 may impact one or more of depth 305 of three-dimensional light field 301 and/or resolution of virtual content within three-dimensional light field 301. When control of positions of a first carrier of first display 302 and a second carrier of second display 304 does not change separation distance 303, only a perceived range 307 of three-dimensional light field 301 and not depth 301 of three-dimensional light field 301 may be impacted.

Figure 4:
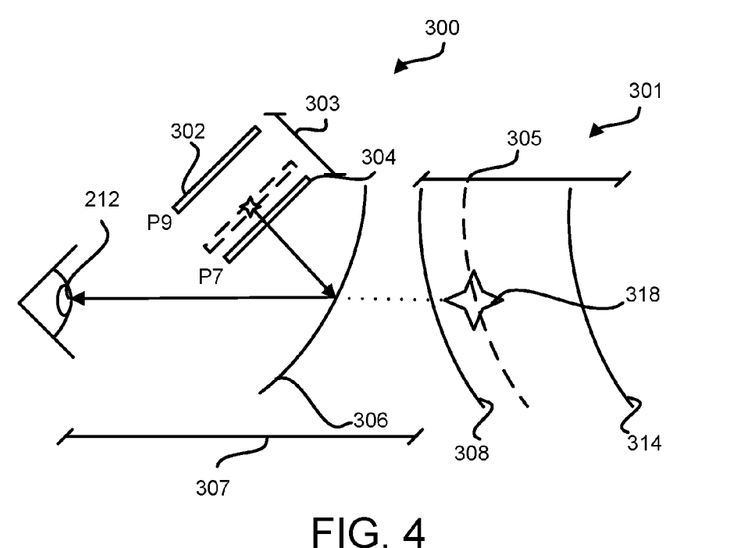
FIG. 4 illustrates another exemplary configuration of a system configured for providing views of virtual content in an augmented reality environment, in accordance with one or more implementations.

FIG. 4 illustrates another configuration of system 300. In FIG. 4, positions of first display 302 and second display 304 may be adjusted (relative to FIG. 3) such that both first display 302 and second display 304 may be closer to optical element 306 however separation distance 303 may be unchanged (relative to FIG. 3). By way of non-limiting illustration, first display 302 may be at position P9; and second display 304 may be at position P7. Position P9 may be closer to optical element 306 than position P6 (FIG. 3); and position P7 may be closer to optical element 306 than position P3 (FIG. 3). By moving both of first display 302 and second display 304 closer to optical element 306, perceived range 307 of three-dimensional light field 301 may be reduced (relative to FIG. 3). By reducing perceived range 307, three-dimensional light field 301 may appear closer to the user. With separation distance 303 being unchanged (relative to FIG. 3), then depth 305 of three-dimensional light field 301 may be unchanged (relative to FIG. 3).

In some implementations, when control of positions of a first carrier of first display 302 and a second carrier of second display 304 adjusts separation distance 303, one or more of perceived range 307 of three-dimensional light field 301, depth 305 of three-dimensional light field 301, and/or resolution of virtual content within three-dimensional light field 301 may be impacted.

Figure 5:
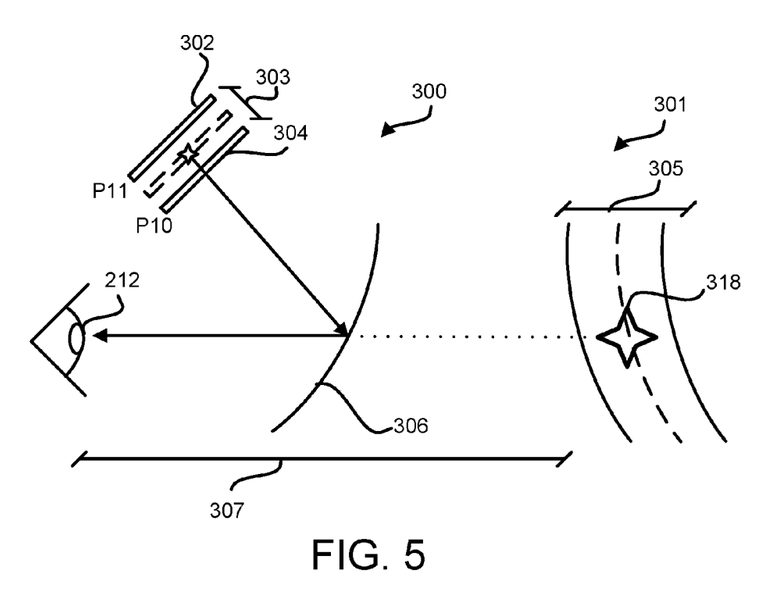
FIG. 5 illustrates another exemplary configuration of a system configured for providing views of virtual content in an augmented reality environment, in accordance with one or more implementations.

FIG. 5 illustrates another configuration of system 300. In FIG. 5, positions of first display 302 and second display 304 may be adjusted (relative to FIG. 4) such that both first display 302 and second display 304 may be farther from optical element 306 and separation distance 303 may be reduced (relative to FIG. 4). By way of non-limiting illustration, first display 302 may be at position P11; and second display 304 may be at position P10. Position P11 may be farther from optical element 306 than position P9 (FIG. 4); and position P10 may be farther from optical element 306 than position P7 (FIG. 4). By moving both of first display 302 and second display 304 farther from optical element 306, perceived range 307 of three-dimensional light field 301 may be increased (e.g., appear farther from the user). With separation distance 303 being decreased (relative to FIG. 4), then depth 305 of three-dimensional light field 301 may be decreased (relative to FIG. 4) and/or the resolution of projected virtual content 318 may be increased (relative to FIG. 4).

Figure 6:
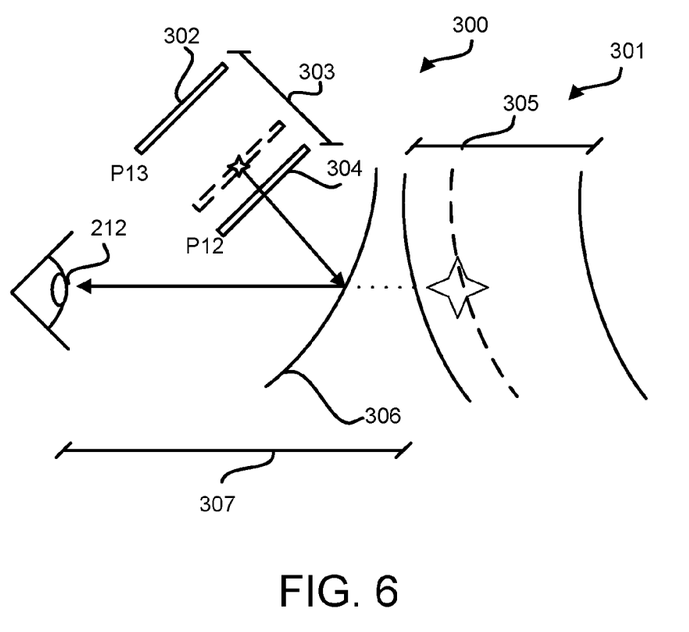
FIG. 6 illustrates another exemplary configuration of a system configured for providing views of virtual content in an augmented reality environment, in accordance with one or more implementations.

FIG. 6 illustrates another configuration of system 300. In FIG. 6, positions of first display 302 and second display 304 may be adjusted (relative to FIG. 5) such that both first display 302 and second display 304 may be closer to optical element 306 and separation distance 303 may be increased (relative to FIG. 5). By way of non-limiting illustration, first display 302 may be at position P13; and second display 304 may be at position P12. Position P13 may be closer to optical element 306 than position P11 (FIG. 5); and position P12 may be closer to optical element 306 than position P10 (FIG. 5). By moving both of first display 302 and second display 304 closer to optical element 306, perceived range 307 of three-dimensional light field 301 may be reduced (relative FIG. 5). With separation distance 303 being increased (relative to FIG. 5), depth 305 of three-dimensional light field 301 may be increased (relative to FIG. 5) and/or the resolution of projected virtual content 318 may be decreased (relative to FIG. 5).

Figure 7:
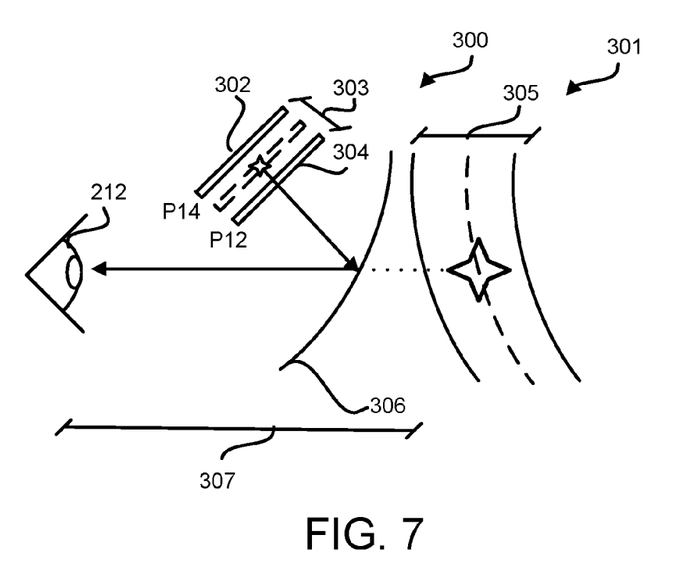
FIG. 7 illustrates another exemplary configuration of a system configured for providing views of virtual content in an augmented reality environment, in accordance with one or more implementations.

FIG. 7 illustrates another configuration of system 300. In FIG. 7, position of first display 302 may be adjusted (relative to FIG. 6) such that first display 302 may be closer to optical element 306 and separation distance 303 may be decreased (relative to FIG. 6). By way of non-limiting illustration, first display 302 may be at position P14; and second display 304 may be at position P12. Position P14 may be closer to optical element 306 than position P13 (FIG. 6). By moving first display 302 closer to optical element 306, perceived range 307 of three-dimensional light field 301 may be unchanged (relative to FIG. 6). However, with separation distance 303 being decreased (relative to FIG. 6), depth 305 of three-dimensional light field 301 may be decreased (relative to FIG. 6) and/or the resolution of projected virtual content 318 may be increased (relative to FIG. 6).

Returning to FIG. 1, processor(s) 104, one or more displays 120, one or more optical elements 122, external resources 124, and/or other components may be operatively linked via one or more electronic communication links. For example, such electronic communication links may be established, at least in part, via network(s) 116. Network(s) 116 may comprise one or both of wired or wireless communications. It will be appreciated that this is not intended to be limiting and that the scope of this disclosure includes implementations in which processor(s) 104, one or more displays 120, one or more optical elements 122, external resources 124, and/or other components may be operatively linked via some other communication media.

The external resources 124 may include sources of information, hosts, external entities participating with system 100, providers of virtual content, and/or other resources. In some implementations, some or all of the functionality attributed herein to external resources 124 may be provided by resources included in system 100.

The processor(s) 104 may include and/or have access to electronic storage 114, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 114 may comprise electronic storage media that electronically stores information. The electronic storage media of electronic storage 114 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 114 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 114 may include one or more virtual storage resources (e.g., cloud storage, a virtual private network, and/or other virtual storage resources). Electronic storage 114 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108 and/or 110. Processor(s) 104 may be configured to execute components 108 and/or 110 by software; hardware; firmware; some combination of software, hardware, and/or firmware; and/or other mechanisms for configuring processing capabilities on processor(s) 104.

It should be appreciated that although components 108 and/or 110 are illustrated in FIG. 1 as being co-located within a single processing unit, in implementations in which processor(s) 104 includes multiple processing units, one or more of components 108 and/or 110 may be located remotely from the other components. The description of the functionality provided by the different components 108 and/or 110 described above is for illustrative purposes and is not intended to be limiting, as any of components 108 and/or 110 may provide more or less functionality than is described. For example, one or more of components 108 and/or 110 may be eliminated, and some or all of its functionality may be provided by other ones of components 108, 110, and/or other components. As another example, processor(s) 104 may be configured to execute one or more additional components that may perform some or all of the functionality attributed to one of components 108 and/or 110.

Figure 8:
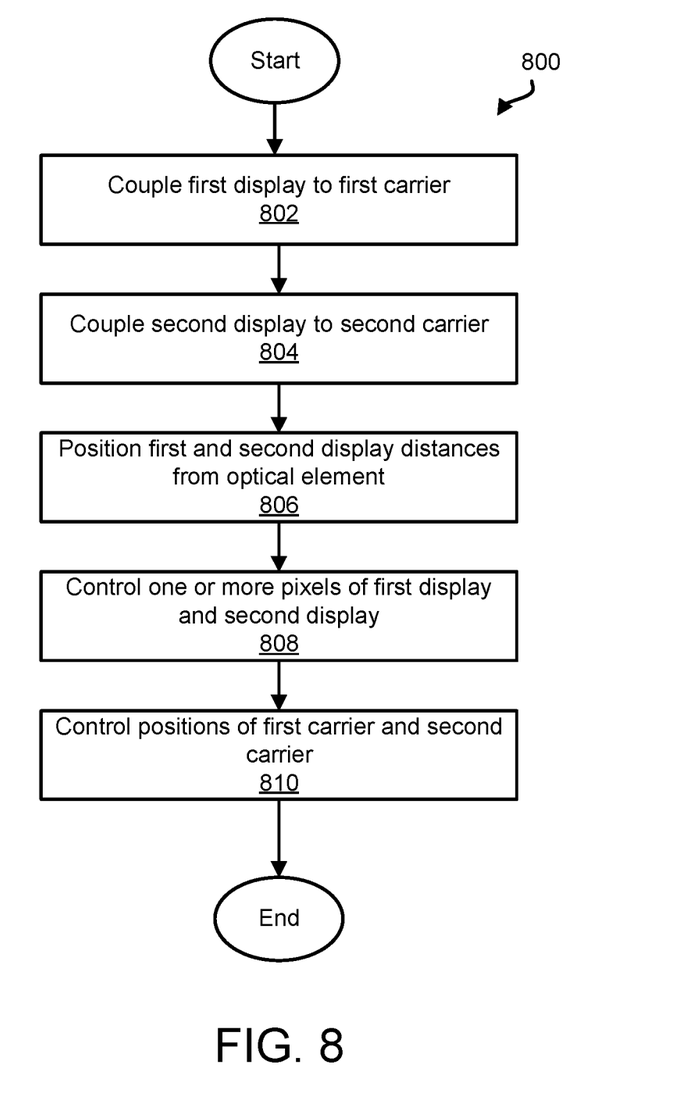
FIG. 8 illustrates a method of providing views of virtual content in an augmented reality environment, in accordance with one or more implementations.

FIG. 8 illustrates a method 800 of providing views of virtual content in an augmented reality environment, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more displays, one or more optical elements, and/or other components. The one or more processing devices may include one or more devices executing some or all of the operations of method 800 in response to instructions stored electronically on electronic storage medium. The one or more processing devices may include one or more devices configured through hardware, firmware, and/or software to be specifically designed for execution of one or more of the operations of method 800.

At an operation 802, one or more displays may be coupled to one or more carriers. By way of non-limiting illustration, a first display may be coupled to a first carrier. In some implementations, operation 802 may be performed using one or more displays the same as or similar to one or more displays 120 (shown in FIG. 1 and described herein).

At an operation 804, one or more displays may be coupled to one or more carriers. By way of non-limiting illustration, a second display may be coupled to a second carrier. In some implementations, operation 804 may be performed using one or more displays the same as or similar to one or more displays 120 (shown in FIG. 1 and described herein).

At an operation 806, individual displays may be positioned individual distances from one or more optical elements. By way of non-limiting illustration, the first display may be positioned a first distance from an optical element; and the second display may be positioned a second distance from the optical element. The optical element may be configured to reflect light emitted from the first display in a first focal plane of a perceived three-dimensional light field and to reflect light emitted from the second display in a second focal plane of the perceived three-dimensional light field. In some implementations, operation 806 may be performed by one or more physical processors executing a display control component the same as or similar to display control component 110 (shown in FIG. 1 and described herein).

At an operation 808, one or more pixels of one or more displays may be controlled. By way of non-limiting illustration, a relative intensity of one or more pixels of the first display and the second display may be controlled to generate the perceived three-dimensional light field. The three-dimensional light field may include virtual content positioned within the three-dimensional light field. The control of the relative intensity of the one or more pixels of the first display and the second display may determine perceived ranges to the virtual content within the three-dimensional light field. In some implementations, operation 808 may be performed by one or more physical processors executing a display control component the same as or similar to display control component 110 (shown in FIG. 1 and described herein).

At an operation 810, positions of individual carriers may be controlled. By way of non-limiting illustration, positions of the first carrier and second carrier may be controlled to adjust the first distance and the second distance. The first distance and/or the second distance may impact a perceived range of the three-dimensional light field. In some implementations, operation 810 may be performed by one or more physical processors executing a display control component the same as or similar to display control component 110 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide views of virtual content in an augmented reality environment:
    a first display coupled to a first carrier;
    a second display coupled to a second carrier, the second display being arranged a first separation distance from the first display;
    an optical element, the optical element being arranged a first distance from the first display and a second distance from the second display, the optical element being configured to reflect light emitted from the first display in a first focal plane and to reflect light emitted from the second display in a second focal plane; and
    one or more physical processors configured by machine-readable instructions to:
    control a relative intensity of one or more pixels of the first display and the second display to cause virtual content to be perceived as being present in the real world, the control of the relative intensity of the one or more pixels of the first display and the second display further determining perceived ranges to the virtual content; and
    control position of the first carrier to adjust the first distance, the first distance impacting a perceived range of the first focal plane.

2. The system of claim 1, wherein the one or more physical processors are further configured by the machine-readable instructions:
    control position of the second carrier to adjust the second distance, the second distance impacting a perceived range of the second focal plane.

3. The system of claim 2, wherein the position of the first display and the position of the second display are independently controlled via the first carrier and the second carrier such that the first distance is independently adjustable from the second distance to adjust the first separation distance.

4. The system of claim 2, wherein the position of the first display and the position of the second display are simultaneously controlled via the first carrier and the second carrier such that first separation distance does not change.

5. The system of claim 1, wherein the first separation distance impacts a perceived depth between the first focal plane and the second focal plane.

6. The system of claim 5, wherein the first separation distance further impacts a resolution of the virtual content perceived as being present in the real world.

7. The system of claim 6, wherein increasing the first separation distance causes the depth to increase and the resolution to decrease, and decreasing the first separation distance causes the depth to decrease and the resolution to increase.

8. The system of claim 1, wherein one or more of the first display, the second display, the optical element, or the one or more physical processors are incorporated into a head-mounted display.

9. The system of claim 1, wherein the optical element is formed from a reflective or partially reflective material.

10. The system of claim 1, wherein the one or more physical processors are further configured by the machine-readable instructions to:
    control the relative intensity of the one or more pixels of the first display and the second display such that pixels of the first display are brighter than pixels of the second display to cause the virtual content to be perceived closer to the first focal plane; or
    control the relative intensity of the one or more pixels of the first display and the second display such that the pixels of the second display are brighter than the pixels of the first display to cause the virtual content to be perceived closer to the second focal plane.

11. A method to provide views of virtual content in an augmented reality environment, the method being implemented in a system comprising a first display, a second display, an optical element, one or more physical processors, and non-transitory electronic storage configured by machine-readable instructions, the method comprising:
    coupling the first display to a first carrier;
    coupling the second display to a second carrier, the second display being arranged a first separation distance from the first display;
    positioning the first display a first distance from the optical element and the second display a second distance from the optical element, the optical element being configured to reflect light emitted from the first display in a first focal plane and to reflect light emitted from the second display in a second focal plane;
    controlling a relative intensity of one or more pixels of the first display and the second display to cause virtual content to be perceived as being present in the real world, the control of the relative intensity of the one or more pixels of the first display and the second display further determining perceived ranges to the virtual content; and
    controlling a position of the first carrier to adjust the first distance, the first distance impacting a perceived range of the first focal plane.

12. The method of claim 11, further comprising:
controlling a position of the second carrier to adjust the second distance, the second distance impacting a perceived range of the second focal plane.

13. The method of claim 12, wherein the position of the first display and the position of the second display are independently controlled via the first carrier and the second carrier such that the first distance is independently adjustable from the second distance to adjust the first separation distance.

14. The method of claim 12, wherein the position of the first display and the position of the second display are simultaneously controlled via the first carrier and the second carrier such that first separation distance does not change.

15. The method of claim 11, wherein the first separation distance impacts a perceived depth between the first focal plane and the second focal plane.

16. The method of claim 15, wherein the first separation distance further impacts a resolution of the virtual content perceived as being present in the real world.

17. The method of claim 16, wherein increasing the first separation distance causes the depth to increase and the resolution to decrease, and decreasing the first separation distance causes the depth to decrease and the resolution to increase.

18. The method of claim 11, wherein one or more of the first display, the second display, the optical element, or the one or more physical processors are incorporated into a head-mounted display.

19. The method of claim 11, wherein the optical element is formed from a reflective or partially reflective material.

20. The method of claim 11, further comprising:
controlling the relative intensity of the one or more pixels of the first display and the second display such that pixels of the first display are brighter than pixels of the second display to cause the virtual content to be perceived closer to the first focal plane; or
controlling the relative intensity of the one or more pixels of the first display and the second display such that the pixels of the second display are brighter than the pixels of the first display to cause the virtual content to be perceived closer to the second focal plane.

* * * * *